Dec. 12, 1950   W. H. SCOTT   2,533,518
WARNING APPARATUS FOR MOTOR VEHICLE OPERATORS
Filed Feb. 14, 1950
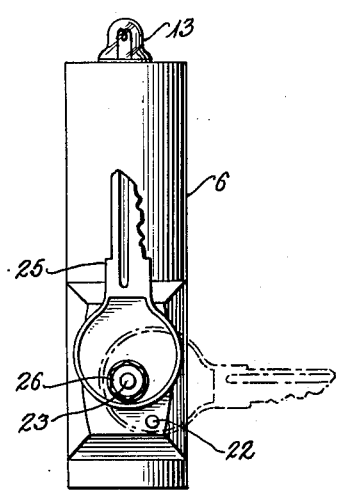
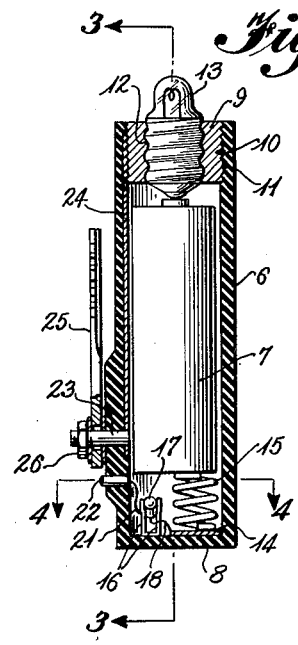
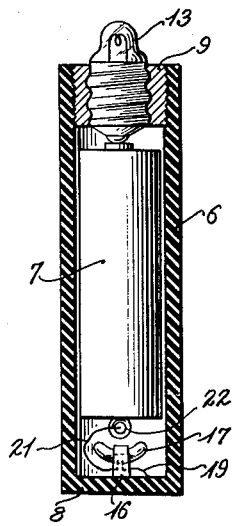
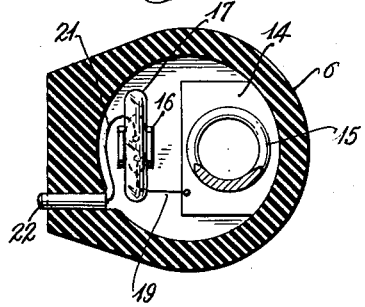
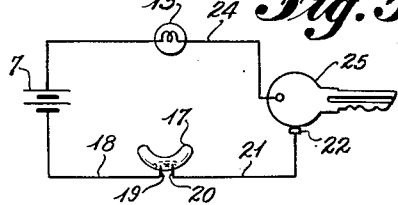
INVENTOR
*William H. Scott*
BY *Burns, Doane & Benedict*
ATTORNEYS Patented Dec. 12, 1950

2,533,518

UNITED STATES PATENT OFFICE 2,533,518

WARNING APPARATUS FOR MOTOR VEHICLE OPERATORS

William H. Scott, Gettysburg, Pa.

Application February 14, 1950, Serial No. 144,063

6 Claims. (Cl. 177—311)

The present invention relates to apparatus for warning a motor vehicle operator against leaving an ignition key in the ignition lock of an unattended motor vehicle.

The likelihood of theft of a motor vehicle is substantially increased when the vehicle is left unattended with the ignition key in the ignition lock. Some cities have passed ordinances prohibiting the leaving of the key in the ignition lock of an unattended vehicle and fines are imposed for violation of such ordinances. Cities having such ordinances have experienced substantial reductions in the number of reported thefts of automobiles, particularly thefts by juveniles. Even where not prohibited by law, the practice of leaving the key in an unattended vehicle is poor practice and is not ordinarily indulged in by cautious persons. However, many operators become preoccupied and unintentionally leave the key in the ignition lock of the vehicle.

The primary object of this invention is to provide warning apparatus which will eliminate or substantially reduce the likelihood of an operator unintentionally leaving the ignition key in a motor vehicle. A further object of the invention is to provide a small and compact apparatus for use with an ignition key which will warn an operator that the key should be removed when the motor of the vehicle is stopped. Still a further object of the invention is to provide warning apparatus of the type described which utilizes electric current to actuate a warning indicator at the time most appropriate to assure removal of the key from the ignition lock.

The foregoing and other objects and advantages of the invention will be explained in greater detail in the following description of an exemplary form of the invention. This description has reference to the accompanying drawing, wherein:

Fig. 1 is a side elevation view of apparatus embodying my invention and showing in full lines an ignition key in retracted or inoperative position and illustrating in dotted lines the key in projected or operative position for insertion in an ignition lock;

Fig. 2 is a longitudinal sectional view of the apparatus;

Fig. 3 is a sectional view taken in the direction of the arrows along the lines 3—3 of Fig. 2;

Fig. 4 is an enlarged sectional view taken in the direction of the arrows along the lines 4—4 of Fig. 2; and Fig. 5 is a wiring diagram of the apparatus.

A case 6, which may be of plastic or other insulating material, forms the container for a small dry cell battery 7. One end of the case may be permanently closed by an end wall 8. An annular ring 9 of metal or other electrically conductive material is provided with screw threads 10 on its outer periphery and this member is removably threaded into the open end of the case 6, such open end being provided with screw threads 11. The ring 9 is also provided with internal threads 12 which receive the base of a warning indicator such as a small incandescent lamp designated generally by the reference numeral 13.

A metallic plate 14 is embedded in or otherwise secured to the wall 8 at the closed end of the case 6. A compression spring 15 is interposed between the plate 14 and the base of the battery 7. The end wall 8 may be provided with a pair of upstanding fingers 16 which form rigid supports for a switch such as a mercury switch designated generally by the numeral 17 and which is responsive to the angular position of the case 6. Conductor 18 connects the plate 14 with one pole 19 of the switch 17. The other pole 20 of the switch 17 is connected by means of a conductor 21 to a contact element 22 which is embedded or otherwise secured in the side wall of the case 6 and which projects slightly beyond the outer surface of the case.

A shaft is embedded or otherwise secured in the side wall of the case a small distance from the contact element 22. An electrically conductive strip 24 has one end electrically connected to the shaft 23 while the opposite end is deformed to fit the screw threads 11 at the open end of the case and to make electrical contact with the annular ring 9.

The ignition key 25 of a motor vehicle may be positioned on the outer end of the shaft 23 and retained thereon by means of a nut 26 in the manner clearly illustrated in the drawing. The key 25 is pivotally movable about the shaft 23. When that key is in the position illustrated in full lines in Fig. 1, the warning indicator circuit is open and no current can flow from the battery 7 to the lamp 13. The key 25 can be moved to the position illustrated in dotted lines in Fig. 1, in which case the key contacts the contact element 22 and the warning indicator circuit will then be closed if the case 6 and the mercury switch 17 are in such position that the mercury spans the poles 19 and 20. It will be seen that current will flow from the positive terminal of the battery through the lamp 13, the ring 9, the conductive strip 24, the shaft 23, the key 25, the contact element 22, the wire 21, the mercury and the poles 19 and 20 of the switch 17, the wire 18, the plate 14 and the spring 15 to the negative terminal of the battery.

The apparatus may be considered as including two switches which are in series in the warning indicator circuit. The switch 17 is responsive to the angular position of the case 6 to which the switch is rigidly attached. The second switch comprises the shaft 23, the contact element 22 and the key 25, and this second switch is responsive to the pivotal position of the key relative to the case 6.

The key 25 should be positioned as illustrated in full lines in Fig. 1 when the key is not in use. The warning indicator circuit is then open and no current can flow from the battery 7 to the lamp 13 irrespective of the angular position of the case and the switch 17. The key 25 can be pivotally moved to the position illustrated in dotted lines in Fig. 1 when it is desired to insert the key in the ignition lock. The lamp 13 will be illuminated during such insertion because both switches will be closed but as soon as the switch and case are turned to unlock the ignition the mercury in the switch 17 will flow to one end of the envelope of the switch and will cease to span the poles 19 and 20. In this manner the lamp 13 will not be illuminated while the key is in the ignition lock with the ignition unlocked. As soon as the operator turns the case 6 and key 25 to lock the ignition, the switch 17 will close the warning indicator circuit and the lamp 13 will be illuminated. The operator's attention will be called to the illuminated lamp and he will be reminded that the key should be withdrawn from the lock.

Some garages and parking lots or similar establishments require that the key be left in the ignition lock so that attendants may start the vehicle motor. To provide for this situation it is possible to pivotally move the key 25 to a position diametrically opposite that illustrated in dotted lines in Fig. 1. In that position the key will not be in engagement with the contact element 22 and the warning indicator circuit will remain open in spite of the fact that the key is in the ignition lock with the ignition in locked condition.

I have illustrated and described the apparatus as arranged for use with vehicles in which the key hole of the ignition lock is vertical while the ignition is locked and in which the key hole is at an angle to the vertical while the ignition is unlocked. This is presently the customary arrangement. It will be apparent that the relative position of the switch 17 and the case or pivotal axis of the key can be varied to obtain the advantages of the invention in those vehicles having ignition locks which have key holes disposed at other than the conventional angles.

The apparatus is small and compact. It can be manufactured and distributed at a cost comparable to the cost of small pocket flash lights. The lamp 13 is readily removable for replacement. The battery 7 may be removed and replaced by removing the ring 9 from the open end of the case.

I have illustrated the switch 17 as being of the mercury type but it will be apparent that any other switch which is responsive to changes in angular position may be substituted. I have illustrated the warning indicator as a lamp but it will be obvious that any other indicator which would attract the attention of the operator could be used. The illustrated form of the invention is exemplary only and I do not limit myself to the details of the apparatus except to the extent defined by the following claims.

Having thus described my invention, I claim:

1. Apparatus for warning a motor vehicle operator against leaving a key in the ignition lock of the vehicle comprising a case, a key pivotally mounted on said case, a warning indicator circuit, a battery in said circuit, a warning indicator in said circuit, a first switch in said circuit responsive to the angular position of said case, and a second switch in said circuit in series with said first switch and responsive to the pivotal position of said key relative to said case, said switches cooperating to close said circuit while said key is in an ignition lock with the ignition locked.

2. Apparatus for warning a motor vehicle operator against leaving a key in the ignition lock of the vehicle comprising a case, a warning indicator circuit, a battery in said circuit, a warning indicator in said circuit, a first switch in said circuit responsive to the angular positioning of said case, and a second switch in said circuit in series with said first switch and responsive to the pivotal position of a key pivotally mounted on said case.

3. Apparatus for warning a motor vehicle operator against leaving a key in the ignition lock of a vehicle comprising a case, a key pivotally mounted on said case, a warning indicator circuit, a battery in said circuit, a warning indicator in said circuit, a first switch in said circuit which is closed while said case is in one angular position, and a second switch in said circuit in series with said first switch which second switch is closed while said key is in one pivotal position relative to said case.

4. Apparatus for warning a motor vehicle operator against leaving a key in the ignition lock of the vehicle comprising a warning indicator circuit, a battery in said circuit, a warning indicator in said circuit, and a pair of switches in series in said circuit, the first of said switches being closed in one angular position of the apparatus and the second of said switches having means for pivotally supporting a key and being closed by positioning of a key supported by said means in one pivotal position relative to the apparatus.

5. Apparatus as defined in claim 4 in which said first switch is a mercury switch.

6. Apparatus as defined in claim 4 in which said warning indicator is an incandescent lamp.

WILLIAM H. SCOTT.

REFERENCES CITED

The following references are of record in the file of this patent:

UNITED STATES PATENTS

| Number | Name | Date |
|---|---|---|
| 2,215,162 | Scott | Sept. 17, 1940 |
| 2,393,373 | Hendrix | Jan. 22, 1946 |

FOREIGN PATENTS

| Number | Country | Date |
|---|---|---|
| 636,564 | Germany | Oct. 12, 1936 |